United States Patent [19]
Holze, Jr.

[11] 4,363,992
[45] Dec. 14, 1982

[54] RESONATOR EXHIBITING UNIFORM MOTIONAL OUTPUT

[75] Inventor: Ernest P. Holze, Jr., Brewster, N.Y.

[73] Assignee: Branson Ultrasonics Corporation, Newtown, Conn.

[21] Appl. No.: 228,578

[22] Filed: Jan. 26, 1981

[51] Int. Cl.³ .......................... H01L 41/08
[52] U.S. Cl. ...................... 310/323; 74/155; 310/325
[58] Field of Search ............... 310/26, 312, 323, 325; 74/155; 228/110; 56/73.1, 73.3, 73.5, 73.6

[56] References Cited

U.S. PATENT DOCUMENTS

| | | | |
|---|---|---|---|
| 2,704,333 | 3/1955 | Calosi et al. | 310/26 |
| 3,601,084 | 8/1971 | Bird et al. | 310/323 X |
| 3,774,317 | 11/1973 | Balamuth et al. | 310/26 X |
| 4,315,181 | 2/1982 | Holz, Jr. | 310/323 |

Primary Examiner—Mark O. Budd
Attorney, Agent, or Firm—Ervin B. Steinberg; Philip J. Feig

[57] ABSTRACT

This invention relates to resonators as used in sonic or ultrasonic apparatus. Particularly with bar type resonators there is manifest a reduction of vibrational amplitude at the output surface from the central area toward the lateral edges. In the present arrangement the input surface is provided with pads to increase the mass ratio between the input and output sections for effecting substantially uniform motional amplitude along the entire output surface.

6 Claims, 4 Drawing Figures

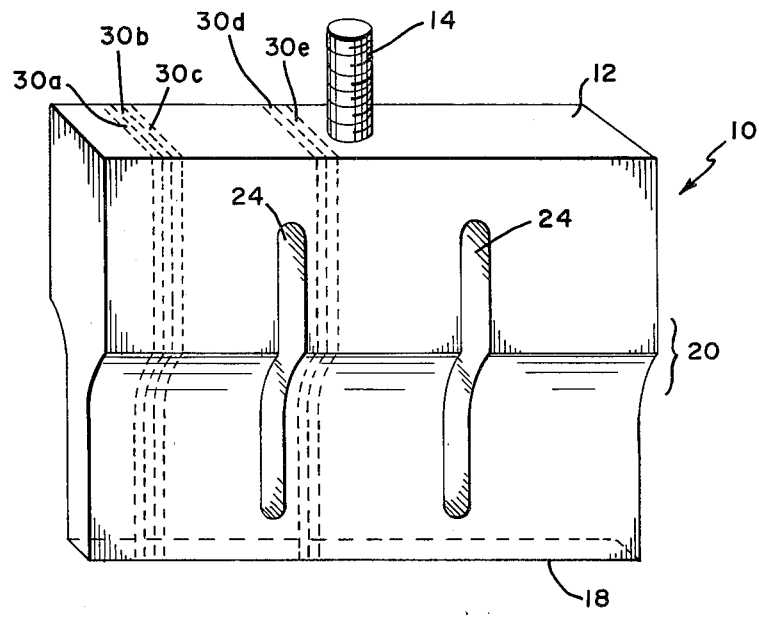
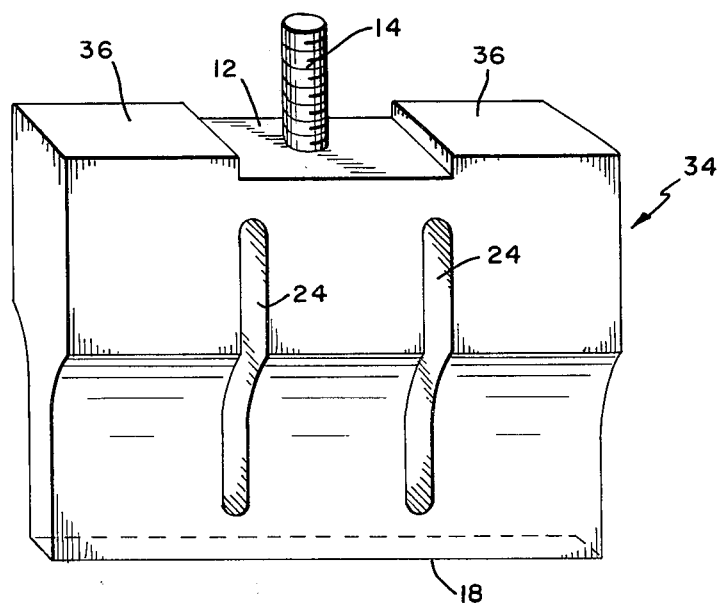

RESONATOR EXHIBITING UNIFORM MOTIONAL OUTPUT

BACKGROUND OF THE INVENTION

This invention relates to resonators, also known as solid horns, concentrators, tools, amplitude or velocity transformers, which are used to couple mechanical vibrations in the sonic or ultrasonic frequency range from a source of vibrations to a workpiece. Resonators of this type are used extensively in connection with ultrasonic apparatus employed for welding thermoplastic workpieces, for welding metallic workpieces, for producing emulsions, etc.

Resonators of the type indicated above are metallic sections dimensioned to be resonant as half wavelength resonators when driven at a predetermined frequency of sound travelling longitudinally therethrough from an input end to an opposite output end. The resonators, depending upon the end use requirements, are made most commonly of aluminum and titanium, less frequently of steel and Monel. A rather comprehensive description of the different types of resonators and their design can be found in "Ultrasonic Engineering" (book) by Julian R. Frederick, John Wiley & Sons, Inc., New York, N.Y. (1965), pp 87–103.

When sealing or bonding superposed layers of textile material by ultrasonic energy, so-called bar resonators are used. Resonators of this type have a rectangular cross section and, most commonly, include a cross-sectional reduction in the nodal zone of the resonator in order to provide increased motional amplitude at the output end when compared with the input end at which the mechanical vibrations are applied. In this manner the resonator, resembling a blade, serves not only to couple vibrations from a source to a workpiece, but also operates as a mechanical amplifier for the vibratory amplitude.

A typical blade-type resonator is shown in U.S. Pat. No. 3,113,225 entitled "Ultrasonic Vibration Generator", issued to C. Kleesattel et al dated Dec. 3, 1963 and the use of such a resonator in connection with sealing superposed textile material by ultrasonic energy is shown in U.S. Pat. No. 3,733,238 dated May 15, 1973 entitled "Apparatus for Vibration Welding of Sheet Material" issued to D. D. Long et al. A similar ultrasonic sealing arrangement is disclosed in U.S. Pat. No. 3,562,041 issued Feb. 9, 1971 entitled "Method and Apparatus for the Ultrasonic Joining of Materials According to a Pattern" in the name of C. A. Robertson which patent reveals the manufacture of shirt sleeve cuffs and similar articles.

The problem heretofore encountered is that the frontal surface of these horns, which may have a width from 4 inch (100 mm) to 8 inch (200 mm) or more, exhibits an uneven vibrational amplitude. Typically, the vibrational amplitude is of the desired amplitude at the center region of the resonator, but decreases significantly toward the lateral edges. When sealing plastic film and textile materials a relatively high motional amplitude is required, typically 0.003 to 0.005 inch (0.08 to 0.13 mm) peak-to-peak displacement, and since the ultrasonic sealing when operating on soft or flexible material is confined to the area directly underneath the resonator, welding of the material may be satisfactory underneath the center portion of the resonator, but unsatisfactory toward the lateral edges of the resonator.

In the past attempts have been made to design a resonator of rectangular configuration, notably a blade type resonator, which exhibits a substantially uniform motional output along the entire output surface. One of the earliest efforts has been the provision of slots which traverse the nodal region of the resonator to thereby break the Poisson coupling, see Kleesattel supra. Further improvements became necessary which are exemplified by P. H. Davis, U.S. Pat. No. 4,131,505 dated Dec. 26, 1978 entitled "Ultrasonic Horn" and German patent publication Ser. No. P 23 43 605 filed Aug. 29, 1973 by Mecasonic S. A.

The Davis patent discloses the use of a peripheral groove in the lower (output) portion of the resonator and applies this groove concept to solid round and rectangular resonators. The Mecasonic patent publication specifically deals with blade-shaped resonators and adds tuned half wavelength resonators at the lateral portions of the resonator in order to obtain substantially uniform motional output along the entire resonator output surface from the central portion to the edges. Assuming a frequency of 20 kHz and material such as aluminum, steel or titanium, a half wavelength resonator is about 5¼ inch (134 mm) long. Hence, considerable weight and height is added to the normally quite heavy resonator by adding two additional half wavelength resonators in a "piggy-back" manner to the input surface of the resonator, see FIG. 4 of the Mecasonic publication.

SUMMARY OF THE INVENTION

The present invention concerns resonators of primarily rectangular or blade-like configuration providing substantially uniform motional output (vibrational amplitude) along the output surface. This improvement is achieved by a slight increase of the mass of the resonator at its lateral portion to increase the normally lower vibrational amplitude of the resonator toward its edge. The vibration amplitude at the output surface of a resonator relative to the vibration amplitude at the input surface is roughly related to the ratio of mass $m_1/m_2$ wherein $m_1$ is the mass of the resonator from the input surface to the nodal plane and $m_2$ the mass of the resonator from the nodal plane to the output surface. Considering that a resonator may be considered to comprise a plurality of parallel mass sections from the input surface to the output surface, it will become apparent that by slightly increasing the mass at the input surface at the lateral portions of the resonator, the reduction in vibrational amplitude of the output surface can be corrected. The actual increase in mass is relatively small and relatively easily accomplished by pads which form an integral part of the input surface of the resonator.

One of the principal objects of this invention is, therefore, the provision of a generally rectangular resonator exhibiting substantially uniform vibrational amplitude along its entire output surface.

Another important object of this invention is the provision of a blade shaped resonator which is driven by vibratory energy at a central portion of its input surface and which provides substantially uniform amplitude of vibration along its entire output surface.

A further important object of this invention is the provision of a generally rectangular resonator particularly adapted for use in connection with joining plastic film and textile material by ultrasonic energy, the resonator providing substantially uniform motional output along its entire elongated output surface which is in contact with the film or the fabric material to be joined.

Still other and further objects of this invention will become more clearly apparent by reference to the following description which is to be read in conjunction with the accompany drawings.

BRIEF DESCRIPTION OF THE DRAWINGS

FIG. 3 is a perspective view of the resonator shown in FIG. 1 with section lines to show the principle of the invention, and FIG. 4 is a perspective view of a resonator provided with the improvements in accordance with the present invention.

DETAILED DESCRIPTION OF THE INVENTION

Figure 1:
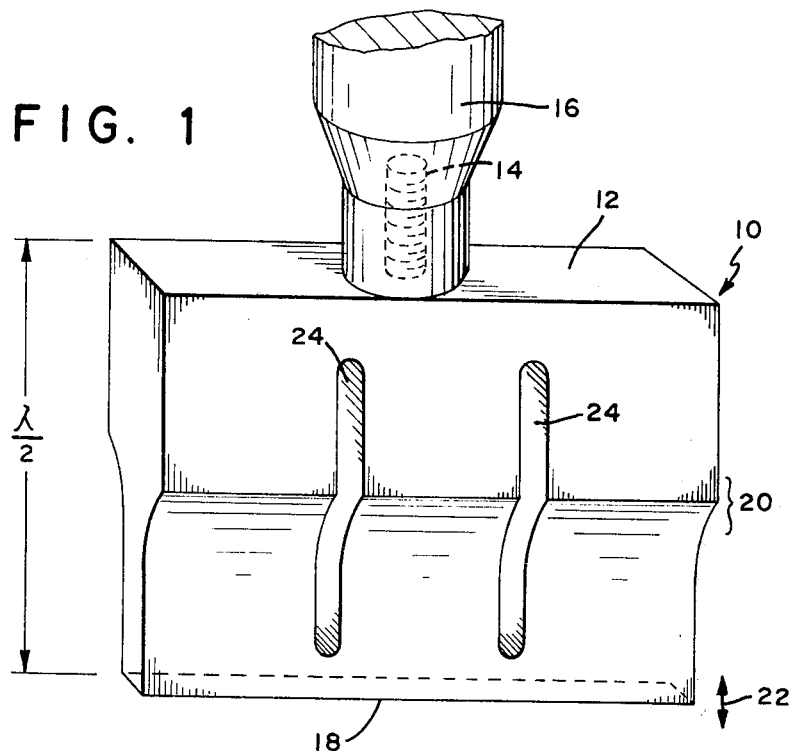
FIG. 1 is a perspective view of a typical resonator known from the prior art.

With reference to the figures and FIG. 1, in particular, there is shown a rectangular resonator of blade-type configuration as used quite conventionally for welding and sealing plastic material by high frequency sonic or ultrasonic energy. Typical frequencies used are in the range from 10 to 50 kHz with most operations being carried out at 20 or 25 kHz. The resonator 10, made typically of aluminum, titanium or steel, has an input surface 12 which is provided at a central portion thereof with a steel stud 14 which is adapted to couple to a source of high frequency vibrations 16, such source being known as an electroacoustic transducer or converter unit which is energized by high frequency electrical energy and produces mechanical vibrations in response to the applied electrical energy. A typical converter unit usable for this purpose is shown in U.S. Pat. No. 3,328,610 issued to S. E. Jacke et al entitled "Sonic Wave Generator" dated June 27, 1967. The resonator 10 is dimensioned to be resonant as a half wavelength resonator ($\lambda/2$) for sound of predetermined frequency (such as 20 kHz) from the input surface 12 to the opposite output surface 18. Under this condition the input surface 12 and the output surface 18 are located at respective antinodal regions of longitudinal motion with a nodal region 20 being disposed therebetween. The resonator provides amplification to the applied input vibrations by virtue of the change in cross sectional area from the input surface to the output surface. As is well known the change in cross section is made generally in the nodal region 20 of longitudinal motion. During operation of the resonator the output surface 18 undergoes reciprocating motion as is indicated by the arrow 22. In order to avoid high stress concentration the change in cross section is not abrupt but made over a larger area 20 with a suitably radiused surface.

The resonator, which may have a width at its output surface 18 of six inch (150 mm) or more, is provided with a pair of slots 24 in order to interrupt Poisson couplings as has been disclosed by Kleesattel supra. These slots extend through the nodal region 20 and terminate short of the input surface 12 and output surface 18. The two slots 24 are generally placed so that the resonator has a central portion between the slots and two lateral portions to either side of the slots, all of which are of equal size. Resonators of this type are quite standard and well known in the industry and their design is amply disclosed in the prior art stated above.

Figure 2:
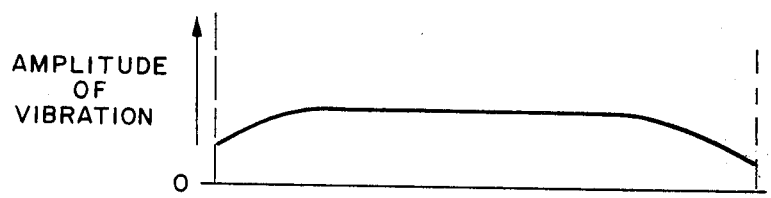
FIG. 2 is a graph of the motional amplitude along the output surface of the resonator per FIG. 1.

FIG. 2 shows a graph of the motional amplitude along the output surface. The graph illustrates the maximum instantaneous displacement of the frontal surface 18 versus location along the frontal surface. The illustration clearly discloses that there is a marked reduction of the motional amplitude toward the lateral edges of the resonator. Depending upon the specific design of the resonator, the reduction in vibrational amplitude may be in the order of 50 percent.

Referring to FIG. 3, there is indicated by dashed lines that the resonator can be considered to comprise an infinite number of juxtaposed narrow longitudinal sections, such as is indicated by numerals 30a to 30e. As is well understood and has been stated heretofore, the amplitude of vibration at the output surface in relation to the vibration applied to the input surface is a function of the cross sectional change provided in the nodal region and, hence, a function of the mass ratio $m_1/m_2$ wherein $m_1$ denotes the mass of a respective section 30a–30e from the input surface to the nodal plane, and $m_2$ denotes the mass of the respective section from the nodal plane to the output surface. Hence, it will be apparent that by increasing the mass $m_1$ of the laterally disposed sections of the resonator, the reduction in motional amplitude shown in FIG. 2 can be compensated.

With reference to FIG. 4, the improved resonator 34 is shown which includes added mass in the form of pads 36 added to the input surface 12 at the laterally disposed portions. In the preferred embodiment, the pads form an integral part of the resonator structure, that is, the resonator input surface is machined in a stepped manner. The pads extend from the lateral edges to a point in line with the outer edge of the respective slot 24, see FIG. 4. Obviously, a slight modification from the preferred embodiment will not be critical. The improvement obtained by the described modification will be apparent by reference to the following tabulation:

| Basic Resonator Without Pads. | |
|---|---|
| Height: | 5.235" |
| Output Surface: | 6" by ¼" |
| Input Surface: | 6" by 1½" |
| Slots: | ⅜" × 3½" |
| Nodal Region: | 1¼" radius |
| Nominal Frequency: | 20 kHz |
| Output Uniformity: 86.6% | |
| Same Resonator Design With ⅛" High Pads. | |
| Output Uniformity: 88.7% | |
| Same Resonator Design With ¼" High Pads. | |
| Output Uniformity: 91.5% | |
| Same Resonator Design With ½" High Pads. | |
| Output Uniformity: 98.3% | | wherein:

$$\% \text{ Output Uniformity} = \frac{\text{min. vibration amplitude} \times 100}{\text{max. vibration amplitude}}$$

It should be noted that the addition of pads causes a small change in horn height and fine tuning of the resonator is required either empirically or by computer simulation.

Similarly a 9 inch wide resonator designed for operation at 20 kHz and of the type shown heretofore without pads exhibited an average motion output uniformity of 87.2%, while with ½" high pads the uniformity became 93.6%; an 8 inch wide horn with pads 3/16" high improved from 87.7% (no pads) to 93.2%.

As seen in FIG. 4, the pads 36 form an integral part of the resonator 34. It is possible also that an aluminum resonator body, for instance, can be provided with steel pads in order to increase the mass ratio. The pads must be intimately bonded to the horn body in order to vibrate in unison with the resonator. It must be realized, however, that the high acceleration forces present at the anitnodal region place severe stresses on the interface between the dissimilar metals. Hence, this modification, while feasible, is not a preferred embodiment of the invention.

It will be apparent that the addition of pads provides a relatively simple and straight-forward solution to a problem which has been troublesome in the past. In contrast with the solution suggested heretofore, particularly the addition of at least a pair of half wavelength resonators which add a large amount of weight and which must be tuned to the operating frequency of the resonator, the improvement disclosed above is characterized by extreme simplicity and requiring only a minor change to the resonator of conventional design.

It will be apparent to those skilled in the art, that the improvement disclosed heretofore will be applicable also to resonators which omit the gain function, that is, resonators which do not include a cross sectional reduction in the nodal region and therefore are designed to provide the same motional amplitude along the output surface as prevails along the input surface. Resonators of this type, unless modified as taught hereinabove, also exhibit the reduction in vibrational amplitude toward the lateral edge regions, especially as the horizontal width of the resonator output surface increases.

While there has been described and illustrated a preferred embodiment of the invention, it will be apparent to those skilled in the art that various changes and modifications may be made therein without affecting the broad principle of the invention which shall be limited only by the scope of the appended claims:

What is claimed is:

1. An ultrasonic resonator of generally rectangular cross-section dimensioned to operate as a half wavelength resonator at a predetermined frequency of sound travelling longitudinally therethrough from an input surface to an oppositely disposed output surface and through a medially disposed nodal region and including a pair of laterally spaced longitudinal slots disposed in said resonator and extending generally from a region near said input surface to a region near said output surface and passing through said nodal region for interrupting Poisson couplings, and including means for applying vibrations of predetermined frequency at a central portion of said input surface, the improvement comprising:

a respective pad disposed at the lateral portions of said input surface for increasing the mass of said resonator at said lateral portions with respect to the central portion of said resonator for achieving substantially uniform motional amplitude along the output surface of the resonator.

2. A resonator as set forth in claim 1, said pads being an integral part of said resonator input surface.

3. A resonator as set forth in claim 1, said resonator including a cross-sectional change from said input surface to said output surface for providing increased motional output at said output surface in respect to the motional input applied at said input surface.

4. A resonator as set forth in claim 3, said pads being an integral part of said resonator input surface.

5. A resonator as set forth in claim 4, said resonator being dimensioned to operate at a predetermined frequency in the frequency range from 10 to 50 kHz.

6. A resonator as set forth in claim 4, said pair of laterally spaced slots dividing said resonator substantially into three portions comprising a central portion generally disposed between said slots and two lateral portions to either side of said slots, said respective pads being disposed at the input surface substantially spanning said lateral portions of the resonator.

* * * * *